March 17, 1936. C. E. SKELTON 2,034,315
ROLLER BEARING
Filed June 14, 1934
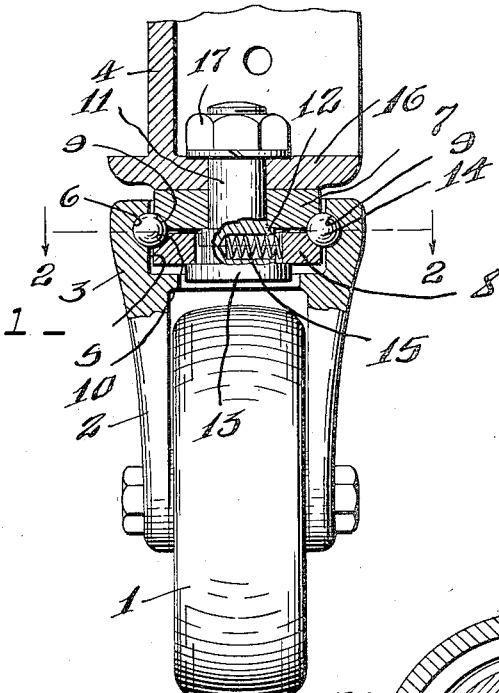
Fig-1-
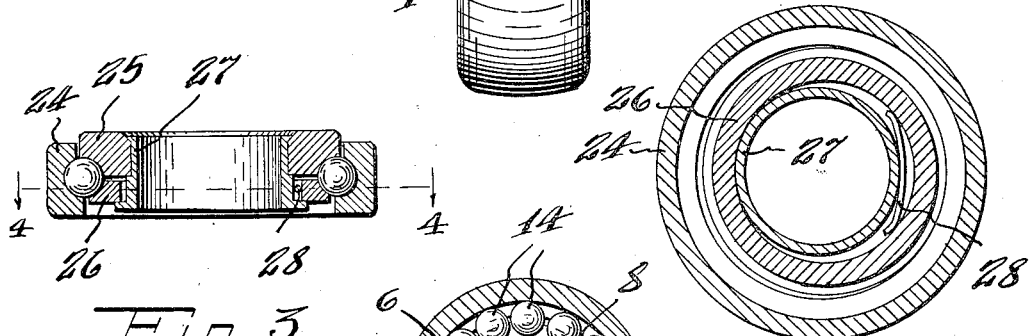
Fig-3-
Fig-4-
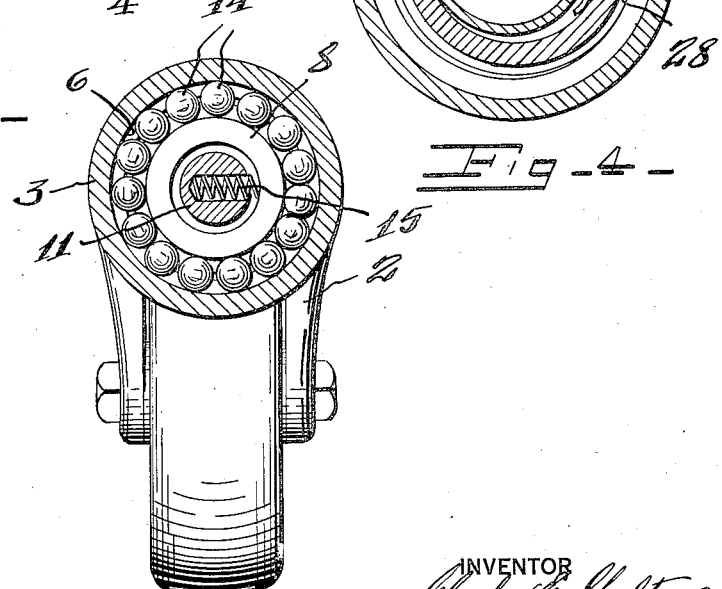
Fig-2-
INVENTOR
Charles E. Skelton
BY Biddle & Thompson
ATTORNEYS.

Patented Mar. 17, 1936

2,034,315

UNITED STATES PATENT OFFICE 2,034,315

ROLLER BEARING

Charles E. Skelton, Syracuse, N. Y.

Application June 14, 1934, Serial No. 730,649

4 Claims. (Cl. 308—230)

This invention relates to anti-friction or ball bearings, and has for its object means for eliminating noise from ball bearings where noise is objectionable, as for instance, in castors such as are used in hospital beds and equipment for hospitals, libraries, and other places, where quietness is desired.

It further has for its object an anti-friction bearing in which the inner raceway for the anti-friction members, as balls, is formed partly in two disks arranged side by side, one being held from axial and radial movement, and the other being shiftable either axially or radially to press against the series of anti-friction members or balls which practically fill the raceways, together with spring means for applying a shifting force whereby the series of anti-friction members or balls are crowded against the raceways, and thus held from a rattling movement. In ball bearings, it is not possible to completely fill the raceways with the balls, as there is always some space left between the balls, and by the term "practically filling the raceways" is meant filling, as far as possible or practical.

It further has for its object an anti-friction bearing in which one of the inner bearing disks is shiftable radially with spring means tending to shift it.

It further has for its object an anti-friction bearing in which one of the disks forming the inner raceway is shiftable axially with spring means for shifting it.

The invention consists in the novel features and in the combinations and constructions hereinafter set forth and claimed.

In describing this invention, reference is had to the accompanying drawing in which like characters designate corresponding parts in all the views.

Figure 1 is an elevation of a castor wheel, the swivel joint of which is an anti-friction or ball bearing provided with my invention, the bearing and contiguous parts being shown in section.

Figure 2 is a sectional view on line 2—2, Figure 1.

Figure 3 is a transverse sectional view through a thrust anti-friction or ball bearing embodying another form of my invention.

Figure 4 is a sectional view on line 4—4, Figure 3.

1 designates a castor wheel mounted on an axle supported by a fork 2 having a head 3 which is swivelled by means of a ball bearing to a support, as the leg 4 of a piece of furniture. As here shown, the head 3 is formed with a cup 5 at its upper end in which is formed an outer raceway 6 of the ball bearing.

7 and 8 designate a pair of bearing disks arranged one above the other in which the inner raceway is formed, this consisting of a portion 9 formed in the upper disk and a portion 10 formed in the lower disk. These disks are mounted upon a support or stem 11, the upper disk 7 being mounted on the stem 11 and held against axial and radial shifting. It is here shown as held from axial shifting by thrusting against the end of the leg 4 and against a shoulder 12 on the stem, and held from radial movement by comparatively snugly fitting the stem 11. The disk 8 has a central bore or larger diameter than the stem and on its lower side thrusts against a head 13 at the lower end of the stem 11. It is of slightly less thickness than the space between the head 13 and the lower face of the disk 7, so that it is free to shift without undue binding effect on the disk 7.

14 designates the annular series of balls in the raceways 6, 9 and 10, this series of balls practically filling the raceways.

In the form shown in Figures 1 and 2, the disk 8 is shiftable radially relative to the disk 7 and the stem 11, and it is shifted by means of a spring 15 located in a radial bore in the stem 11 thrusting at one end against the bottom of the bore and at its other end against the inner annular face of the lower disk 8, that is, against the wall of the bore of the disk 8. The stem 11 is threaded at its upper end and extends through a flange or web 16 in the lower end of the leg 4 and a nut 17 threads on the threaded end of the stem 11, thus clamping the shoulder 12 against the disk 7 and clamping the disk 7 against the lower face of the leg 4.

In operation, the spring 15 thrusts the lower disk eccentrically against the balls 14 and in so doing crowds the balls circumferentially in the raceways, so that they are held from any looseness or rattling movement, particularly when in moving a piece of furniture over the floor, the castor wheel on one or more legs lifts off the floor and tends to swing idly.

In the form shown in Figures 3 and 4, a thrust bearing embodying this invention is shown, wherein 24 designates the outer cup formed with the outer raceway, and 25 and 26 designate the disks in which are formed the inner raceways, one disk 25 being mounted on a central tubular support 27 and held from radial and axial movement, and the other disk being mounted to have a radial shifting movement, as in Figure 1.

In Figures 3 and 4, however, the spring is shown as a bow or leaf spring 28 interposed between the periphery of the central support 27 and the bore of the shiftable disk 26. The action of this bearing is analogous to that of the bearing shown in Figure 1.

In any form of the invention, a portion of the inner raceway is acted upon by a spring tending to crowd the balls together and against one of the raceways, so that they are held from looseness.

What I claim is:

1. A ball bearing comprising inner and outer raceways and balls between the raceways, opposing disks in which the inner raceway is formed, one of the disks being mounted to thrust in a radial direction relatively to the other disk against the balls and spring means tending to thrust said disk.

2. A ball bearing comprising inner and outer raceways, a pair of disks arranged side by side and in the peripheries of which the inner raceway is formed, anti-friction members in the raceways, and spring means acting on one of the disks and tending to shift it radially relative to the other disk.

3. In a ball bearing, a central stem, a pair of disks mounted on the stem, one being fixed from radial and axial movement, and the other being shiftable radially relative to the stem, an inner raceway partly formed in the peripheries of each disk, an outer raceway, and balls in the raceways and practically filling the same, and spring means interposed between the stem and the shiftable disk and acting on the shiftable disk to shift it eccentrically relative to the stem.

4. In a ball bearing, a central stem, a pair of disks mounted on the stem, one being fixed from radial and axial movement, and the other being shiftable radially relative to the stem, an inner raceway partly formed in the peripheries of each disk, an outer raceway, and balls in the raceways and practically filling the same, the stem being formed with a radial bore within the shiftable disk, and a compression spring in said bore and thrusting at its inner end against the bottom of the bore and at its outer end against the shiftable disk.

CHARLES E. SKELTON.